Oct. 8, 1940.  A. RAPPL  2,217,382
MOTOR AND CONTROL THEREFOR
Filed April 1, 1939  2 Sheets-Sheet 1
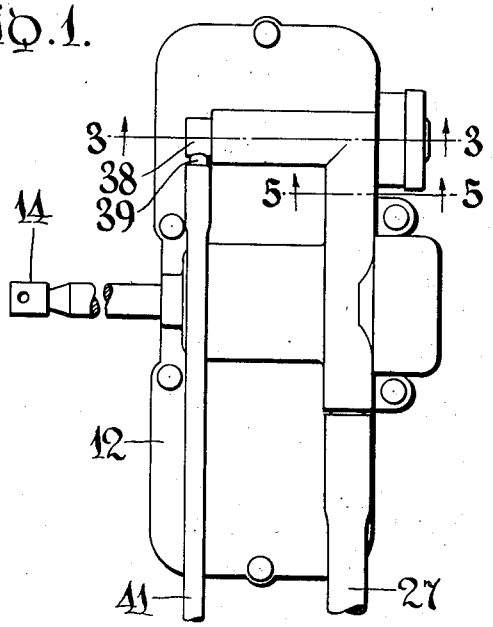
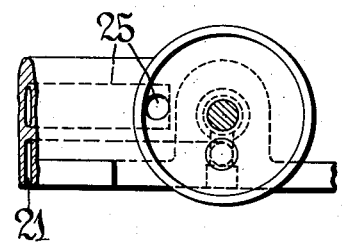
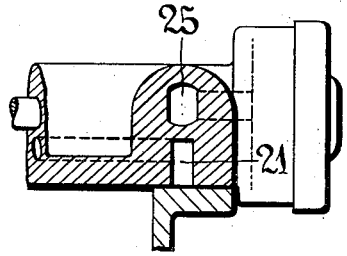
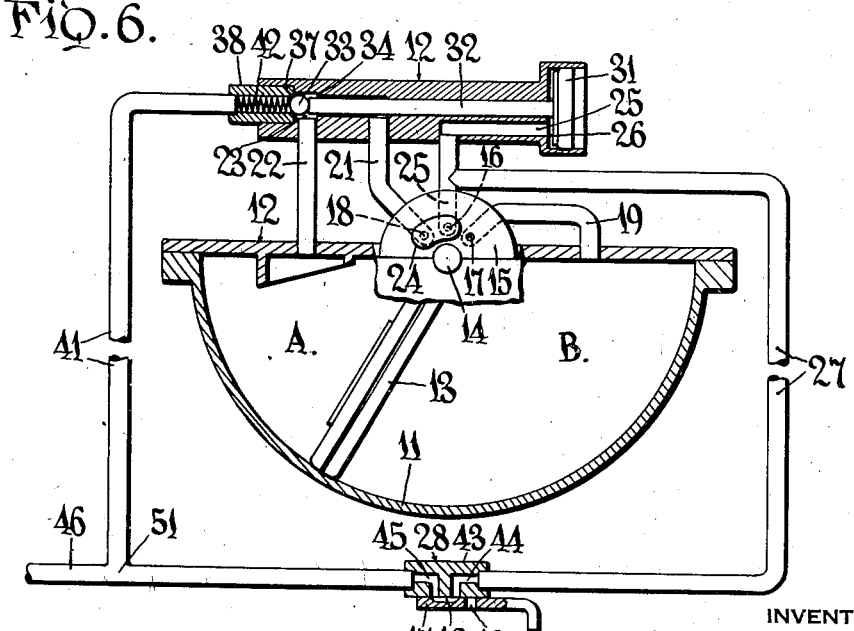
INVENTOR
ANTON RAPPL
BY
Beau, Brooks, Buckley & Beau
ATTORNEYS Oct. 8, 1940.   A. RAPPL   2,217,382
MOTOR AND CONTROL THEREFOR
Filed April 1, 1939   2 Sheets-Sheet 2

INVENTOR
ANTON RAPPL
BY
Beau, Brooks, Buckley & Beau.
ATTORNEYS

UNITED STATES PATENT OFFICE 2,217,382

MOTOR AND CONTROL THEREFOR

Anton Rappl, Buffalo, N. Y., assignor to Trico Products Corporation, Buffalo, N. Y.

Application April 1, 1939, Serial No. 265,467

9 Claims. (Cl. 121—97)

The present invention relates to fluid motors and control means therefor and has particular relation to a motor, such as a windshield cleaner motor, having parking means, and to a control for the motor and parking means which may be remote therefrom. In windshield cleaner motors operated by suction, and also in those operated by greater-than-atmospheric pressure, a piston is oscillated by the alternate application of differential pressures to opposing faces thereof, such alternate application being effected by an automatic valve mechanism which reverses the outlet and inlet ports automatically upon the piston approaching its limit position at the end of each operating stroke. To effect parking, or stopping and holding the piston in one limit position, it is necessary to apply the differential pressures in a predetermined manner, and it is highly desirable to provide means whereby such application is made regardless of the position of the automatic valve mechanism in order that parking will certainly result upon operation of a parking control valve whether the piston is moving in one direction or the other at the time the control valve is operated.

By the present invention an improved apparatus is provided for effecting this result. In such apparatus the control valve may be, if desired, remote from the motor, and may be connected therewith by only two fluid conduits. For example, the motor may be mounted at the upper edge of the windshield of a vehicle, or adjacent a rear window, and the control upon the instrument panel.

These and other objects and advantages will become apparent from the following description of the typical embodiment of the invention illustrated in the accompanying drawings wherein:

Fig. 1 is a plan view of the motor;

Fig. 4 is an elevational view of a fragment of the motor casing cover;

Fig. 5 is a fragmentary vertical sectional view taken along line 5—5 of Fig. 1; and Fig. 6 is a schematic view showing the essential parts of the motor and control apparatus.

Figure 2:
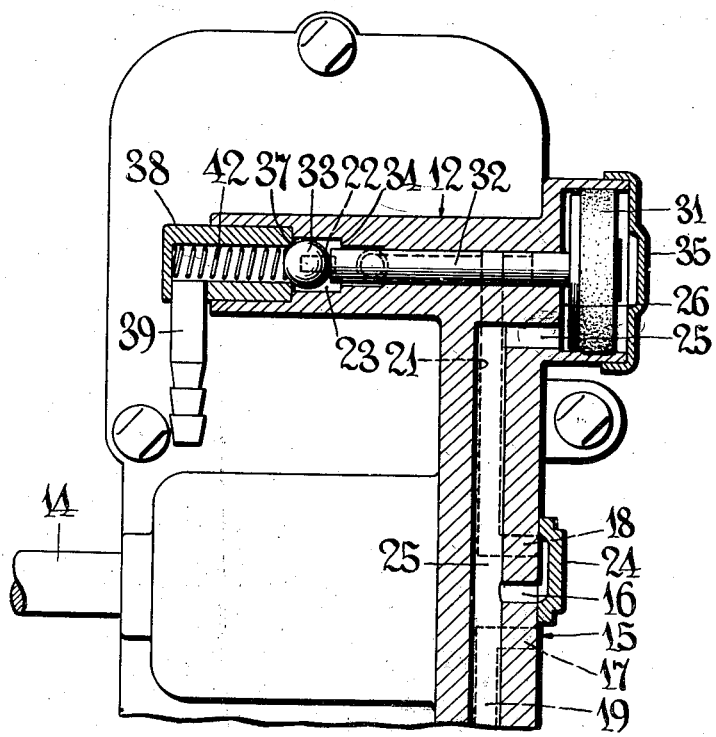
Fig. 2 is a fragmentary plan sectional view, the plane of this section being through the cover of the motor casing.

As shown in the latter view the motor includes a casing 11 with cover 12, and a vane type piston 13 movable in the casing in an arcuate path about the axis of a rock shaft 14, the piston dividing the casing interior into a left chamber A and a right chamber B. Casing cover 12 may be provided with a valve seat 15 having a suction port 16 and right and left atmospheric ports 17 and 18 respectively, port 17 opening through a passage 19 into right chamber B, and port 18 opening through passages 21 and 22, which communicate through a chamber 23 into left chamber A.

A valve 24 movable in an arcuate path upon valve seat 15 has its inner face recessed so that when in the position shown it will cover and connect ports 16 and 18, leaving port 17 open to the atmosphere, but when moved to the right, will cover and connect ports 16 and 17, leaving port 18 open to the atmosphere. Valve 24 may be operated automatically in accordance with movement of piston 13, by any suitable mechanism (not shown herein) such, for example, as the mechanism disclosed in Patent No. 1,978,634 issued October 30, 1934, to Henry Hueber. All that is essential is that the valve 24 move to cover ports 16 and 17 when the piston 13 reaches its limit operating position to the left so that a suction connection to port 16 will serve to withdraw air from chamber B, and uncover port 18 to admit air to chamber A, thereby causing the piston to be moved to the right; and when piston 13 reaches its limit operating position to the right, the valve 24 moves to cover ports 16 and 18 and uncover port 17, admitting air to chamber B and connecting chamber A to a suction connection, causing the piston to be moved to the left.

Formed in the casing cover 12 is a suction passage 25 opening into a cylinder 26, the other end of passage 25 being connected to a conduit 27 extending to a parking valve unit 28. Within cylinder 26, the outer end of which is closed by a cover 35 having an atmospheric vent 36, is a piston 31 having a piston rod 32 extending into chamber 23. In the latter is disposed a ball valve 33 adapted to close against a valve seat 34, thereby closing fluid communication between passages 21 and 22, or to close against a valve seat 37 formed on a tubular member 38 that has a nipple 39 for connection to a parking suction conduit 41.

Figure 3:
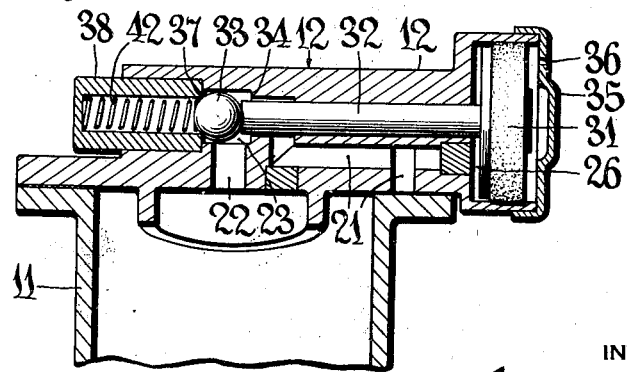
Fig. 3 is a fragmentary vertical sectional view taken along line 3—3 of Fig. 1.

A spring 42 is disposed in member 38 for holding ball valve 33 upon valve seat 34, but when suction is applied, via passage 25, to cylinder 26, the piston 31 is moved to the left (in Figs. 2, 3 and 5) with the result that rod 32 presses the ball valve upon seat 37 against the compression of spring 42.

The control valve 28 may be of any suitable construction for connecting conduit 27 to a source of suction to effect operation and venting it to the atmosphere to effect parking. As shown in Fig. 6 it may include a valve seating member 43 having a port 44 communicating with conduit 27 and a port 45 communicating with a conduit 46 leading to the suction source. A control valve 47 slidable on the valve seating member 43 has a recess 48 for connecting ports 44 and 45 in one position of the valve (that shown in Fig. 6) and an atmospheric vent 49 for registration with port 44 when valve 47 is moved to the left from the position shown. The valve may be manually moved to either of these two positions, the unit 28 being capable of being mounted in any suitable position relative to the motor.

Suction parking conduit 41 may extend to any suitable source of suction; if so desired, it may be connected, as indicated at 51, to suction conduit 46.

When the control valve 47 is in the position shown in Fig. 6, the motor operates in the manner hereinbefore described, air being withdrawn therefrom via port 16, opening 29, passage 25, conduit 27, ports 44 and 45, and conduit 46 to the source of suction. Piston 31 is drawn further into cylinder 26 so that the ball valve 33 is held on seat 37, closing conduit 41 from chamber 23, and away from seat 34 so that conduits 21 and 22 are in open communication through chamber 23.

When the control valve 47 is in the parking position wherein ports 44 and 49 are in registry, and port 45 is closed, air is vented through conduit 27 and passage 25 into cylinder chamber 26 so that spring 43 may move ball valve 33, rod 32 and piston 31 to the right (in Figs. 2, 3 and 5) until the ball valve closes against seat 34. Air is withdrawn from chamber A through passage 22, chamber 23, tubular members 38 and 39, and conduit 41 to the source of suction, thereby partially evacuating chamber A with the result that piston 13 will be moved to and held in its maximum position to the left (in Fig. 6) by atmospheric pressure in chamber B. The latter chamber, in the parking position of the control valve 47, will always be subjected to atmospheric pressure, regardless of the position of automatic valve 24. If valve 24 is in the position shown in Fig. 6, air from the atmosphere will enter chamber B directly through port 17 and passage 19. If the valve 24 be in a position covering ports 16 and 17, atmospheric air will enter the chamber via port 44, conduit 27, and passage 25 to port 16, and thence through valve 24 to port 17 and passage 19.

It will be understood that the devices herein described and illustrated are merely illustrative of the inventive principles and combinations involved, and that the same may be incorporated in other embodiments, without departing from the spirit of the invention or the scope of the appended claims. For example, while the invention has been shown and described as applied to a motor in which one of the differential operating pressures is suction or less-than-atmospheric pressure, it will be understood that the invention is also applicable to motors operating on other differential pressures.

I claim:

1. In a windshield cleaner motor and control therefor, a motor chamber and automatic valve means for alternately applying atmospheric pressure and suction to opposite sides of the motor chamber, and parking means comprising means for venting the suction connection of the valve means to the atmosphere, and pressure responsive means operable upon said venting for interrupting fluid communication between the valve means and one side of the motor chamber and for applying suction to said one side of the motor chamber.

2. In a windshield cleaner motor and control therefor associated with a source of suction, a conduit normally connected to the source, a motor chamber having ports at the opposite sides thereof, automatic valve means for alternately connecting said conduit and the atmosphere to said ports, and parking means comprising a control valve for closing said conduit from the source and permitting an increase of pressure in the conduit, and means responsive to said increase of pressure for closing one of said ports from the automatic valve means and opening it to a source of suction.

3. In combination with a fluid pressure motor having automatic valve means for alternately applying differential pressures to opposite sides of the motor chamber, parking means for applying fluid pressure to one side of the motor chamber and simultaneously disrupting fluid communication between said one side of the motor chamber and the automatic valve means, fluid pressure means for operating said parking means, and valve means remote from the motor for controlling said fluid pressure means.

4. In a fluid pressure motor, a motor chamber having a port and automatic valve means for alternately applying atmospheric and a different operating pressure to said port, a parking conduit and a valve for selectively connecting said port to either the parking conduit or the automatic valve means, and fluid pressure means for operating said valve.

5. In a fluid pressure motor, a motor chamber having a port and automatic valve means for alternately applying atmospheric and a different operating pressure to said port, a parking conduit, a valve movable to a position for connecting said port to the parking conduit or to a position for connecting said port to the automatic valve means, spring means normally urging the valve to one of said positions and fluid operated means for moving the valve to the other position against the resistance of said spring.

6. In a fluid pressure motor and control therefor, a motor chamber and automatic valve means for alternately applying atmospheric pressure and an operating pressure different from atmospheric to opposite sides of the motor chamber, and parking means comprising valve means for connecting to the atmosphere the operating pressure connection of the valve means, and pressure responsive means effective upon said connecting to the atmosphere for interrupting fluid communication between the automatic valve means and one side of the motor chamber and for applying to the latter an operating pressure.

7. In a fluid pressure motor and control therefor associated with a source of pressure different from atmospheric pressure, a conduit connected to said source for operation of the motor, a motor chamber having ports at the opposite sides thereof, automatic valve means for alternately connecting said conduit and the atmosphere to said ports, and parking means comprising a control valve for closing said conduit from the source and permitting the pressure in the conduit to approach atmospheric pressure, and means responsive to the foregoing change of pressure for closing one of said ports from the automatic valve means and opening it to said source.

8. In a windshield cleaner motor and control therefor associated with a source of suction, a motor chamber having ports at the opposite sides thereof, an operating conduit connectible to said source, automatic valve means on the motor for alternately connecting said ports to said conduit and to the atmosphere, and parking means comprising a parking conduit connectible to a source of suction and communicating with one motor chamber port, a valve and spring means for normally causing the valve to close said motor chamber port from the automatic valve means, suction operated means connected with the operating conduit for causing the valve to close said motor chamber port from the parking conduit against the resistance of said spring, and valve means for connecting or disconnecting the operating conduit from the source of suction to respectively effect operation or parking of said motor.

9. In a windshield cleaner motor and control therefor, a conduit extending from a source of operating pressure to the motor, a second conduit extending from a source of pressure to the motor for providing pressure for parking the motor, valve means in the first conduit for connecting or disconnecting the latter from the source, and fluid operated means adjacent the motor responsive to disconnection of the first conduit from the source to operatively connect the motor to the parking conduit to effect parking of the motor.

ANTON RAPPL.